United States Patent
Fernandez et al.

(10) Patent No.: US 10,875,810 B2
(45) Date of Patent: Dec. 29, 2020

(54) SELF-REPAIRING CEMENT POLYMER COMPOSITES AND PROCESSES OF MAKING AND USING SAME

(71) Applicant: BATTELLE MEMORIAL INSTITUTE, Richland, WA (US)

(72) Inventors: Carlos A. Fernandez, Kennewick, WA (US); Phillip K. Koech, Richland, WA (US); Wooyong Um, Richland, WA (US); Vassiliki-Alexandra Glezakou, Richland, WA (US); Jaehun Chun, Richland, WA (US); M. Ian Childers, Richland, WA (US); Manh Thuong Nguyen, Richland, WA (US); Kenton A. Rod, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 0 days.

(21) Appl. No.: 16/443,576

(22) Filed: Jun. 17, 2019

(65) Prior Publication Data
US 2020/0024192 A1 Jan. 23, 2020

Related U.S. Application Data

(63) Continuation-in-part of application No. 15/677,993, filed on Aug. 15, 2017, now Pat. No. 10,370,577.
(Continued)

(51) Int. Cl.
*C04B 28/04* (2006.01)
*C04B 24/32* (2006.01)
(Continued)

(52) U.S. Cl.
CPC ............ *C04B 28/04* (2013.01); *C04B 24/281* (2013.01); *C04B 24/32* (2013.01);
(Continued)

(58) Field of Classification Search
CPC ........ C09K 8/467; C09K 8/428; C04B 24/16; C04B 24/281; C04B 24/32; C04B 2103/0062; E21B 33/14
See application file for complete search history.

(56) References Cited

U.S. PATENT DOCUMENTS

| | | | | |
|---|---|---|---|---|
| 2,919,262 A | * | 12/1959 | Nummy | C08G 75/14 568/66 |
| 3,869,435 A | * | 3/1975 | Trivette, Jr. | C07D 235/28 525/341 |
| 2014/0066589 A1 | * | 3/2014 | Puskas | C08G 63/688 528/360 |

OTHER PUBLICATIONS

Kamaishi, Tadami, Composition for forming water permeable material and process for producing the same, Jun. 1, 1999. (U.S. Pat. No. 5,908,808) (Year: 1999).*

* cited by examiner

*Primary Examiner* — Silvana C Runyan
(74) *Attorney, Agent, or Firm* — Derek H. Maughan

(57) ABSTRACT

Examples of novel self-repairing cement-polymer composites and processes of making and using are detailed that address various problems in prior art cements. These matrices, compositions and materials that are more mechanically robust, thermally stable and chemically resistant and demonstrate better bonding to various structures and materials, than other self-healing cements known in the prior art. When in place under preselected conditions (the formulation of the slurry can be modified for optimal effectiveness under various conditions) the organic, cross linking and cement forming portions within the slurry form interconnecting chemical bonds and cures to form a self-repairing and self-re-adhering cement polymer composite matrix in the receiving location.

17 Claims, 11 Drawing Sheets

Related U.S. Application Data

(60) Provisional application No. 62/375,339, filed on Aug. 15, 2016.

(51) Int. Cl.
*C04B 24/28* (2006.01)
*C04B 111/20* (2006.01)
*C04B 103/40* (2006.01)
*C04B 111/74* (2006.01)

(52) U.S. Cl.
CPC ... *C04B 2103/40* (2013.01); *C04B 2111/2038* (2013.01); *C04B 2111/74* (2013.01)

Exemplary Crosslinking Agents and Coordination Groups (Linkers)

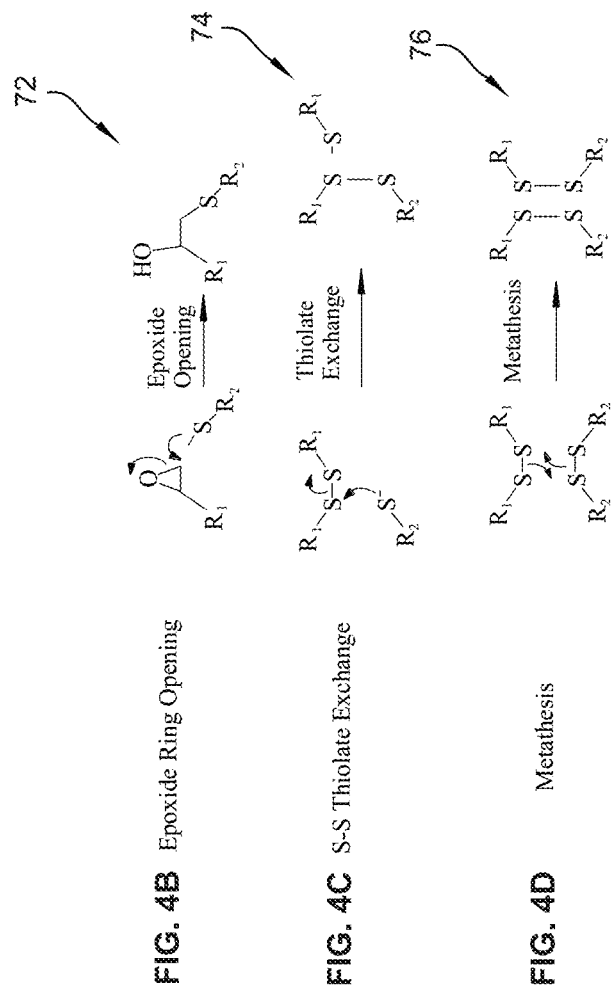

Metal Co-Ordination Chemistry

Ionic Coordination

SELF-REPAIRING CEMENT POLYMER COMPOSITES AND PROCESSES OF MAKING AND USING SAME

CROSS REFERENCE TO RELATED APPLICATION

This application is continuation in part of U.S. patent application Ser. No. 15/677,993 now issued U.S. Pat. No. 10,370,577 filed by the same inventors on Aug. 15, 2017 which is a non-provisional application that claims priority to U.S. Provisional Application Ser. No. 62/375,339 filed 15 Aug. 2016 the contents of both applications is incorporated by reference in their entirety herein.

STATEMENT REGARDING RIGHTS TO INVENTION MADE UNDER FEDERALLY-SPONSORED RESEARCH AND DEVELOPMENT

This invention was made with Government support under Contract GTO300000 awarded by the U.S. Department of Energy's Geothermal Technologies Office (GTO) and Contract DE-AC05-76RL01830 awarded by the U.S. Department of Energy. The Government has certain rights in the invention.

FIELD OF THE INVENTION

This disclosure relates to cement composites and compositions for uses in various applications including underground, underwater and unique environments.

BACKGROUND OF THE INVENTION

Ordinary Portland Cements (OPCs) are well known and utilized in several applications including but not limited to structural arrangements. OPCs provide advantages in that they can be delivered to a location in any of a variety of ways as a slurry and then under certain preselected conditions allowed to cure or harden and as a result change from a slurry to hardened material with significant strength and structure. OPCs can find applications in the construction of foundations, buildings, bridges, and the like as well as forming structural elements in various other applications such as sealing of wellbores for oil, gas, extraction, geothermal heat production and other applications.

While OPCs have a relatively high compressive strength, they have a variety of limitations in other ways. For example, in some conditions a comparatively low torsion resistance and poor adhesive strength and provide limited resistance against structural stresses such as mechanical shear and torsion. OPCs may have problems with adhering to various related or adjacent structures such as wellbore casings and geological formations. Poor thermal resistance against rapidly changing temperatures, extreme temperatures, and limited chemical resistance may provide further complications and subject the resulting OPC structure to structural fractures and cracks and other physical and compositional changes. As a result, de-bonding at structural interfaces such as geological formation interfaces and cement-casing junctions may occur. Presently, to repair this cement or to correct this debonding a costly operation shutdown is many times required to access and seal or repair these items. To avoid this costly interruption, numerous cement and polymer-cement composites have been proposed. These so called "self-healing cements" while providing some improvement in cohesion between cement components, lower fluid permeability, and in some instances a better chemical resistance also have a generally 5×-10× lower mechanical strength on average as compared to conventional wellbore cements. In many instances, these cements do not adhere well to structures such including wellbore casings or filler materials such as rock, clay, and sand utilized in buildings and construction.

Most of these "self-healing cement composites" are single event composites meaning that the self-healing components are polymer precursors incapsulated in a structure that releases the repair materials once and as a result, only forms bonds between other like polymers that are available at that point in time. Other self-healing cement composites require presence of co-active fluids such as water or oil to heal fractures. If either of these materials are not available or if for whatever reason there is a gap in time between the interaction of the two the repair will not take place. In view of these problems what is needed is a new and better cement composite that can provide dynamic self-repair of structural fractures over multiple damage events; are thermally and mechanically stable at a range of conditions including elevated temperatures as high as 300° C. or greater; adhere well to various structures and construction materials under various chemical, mechanical, and environmental stresses that are not provided by cements in the prior art. The present disclosure provides significant advances in this regard.

SUMMARY

The present disclosure provides examples of novel self-repairing cement-polymer composites and processes of making and using are detailed that address various problems in prior art cements. These matrices, compositions and materials that are more mechanically robust, thermally stable and chemically resistant and demonstrate better bonding to various structures and materials, than other self-healing cements known in the prior art. In the present description cement polymer composites (typically including a cement-containing material combined with an organic epoxide polymer and/or epoxide oligomers with a crosslinking agent) are combined in an aqueous solvent that forms a cement-polymer composite forming slurry. This slurry can be pumped to a desired location and put in place to affect a repair or form the desired structure. If desired, an optional phase separation inhibitor can also be included to delay the interaction between the polymer, linker and the cement to allow the slurry to harden and cure more slowly.

When in place under preselected conditions (these formulations of the slurry can be modified for optimal effectiveness under various conditions) the organic, cross linking and cement forming portions within the slurry form interconnecting chemical bonds and cures to form a self-repairing and self-re-adhering cement polymer composite matrix in the receiving location. In as much as the particles are not encapsulated there is no dependence upon de-encapsulation to release the binding materials nor is there a problem with premature release of the encapsulated material prior to the desired time for optimal binding.

To the contrary, the presence of epoxide polymer and/or epoxide oligomers and the cross linkers embedded in the slurry (which throughout the life of the concrete will be in differing degrees of hardness or thickness of the slurry) in an unencapsulated form allows the self-repair to take place whenever the items in the slurry (or concrete structure) are exposed to preselected conditions. This, for example, would mean that while a previously described slurry is pumped to a location fills a gap and begins to harden or cure, that the inner portions of the slurry which have not been in contact in those conditions (by nature of their physical separation from the preselected conditions by virtue of the thickness of the slurry) do not react. Later, if this uncontacted portion is brought into contact with the preselected conditions (through a crack for example) that these materials will then react and form the new linked structure. This process of latent reactivity and repair provides significant advances over the prior art.

In one simple arrangement the disclosure provides an example wherein a self-repairing cement-polymer composition comprising a cement containing material; an unencapsulated epoxide having at least one disulfide (S—S) group therein, and a crosslinking agent are all combined to form a dynamically self-repairing cement polymer matrix that reforms chemical bonds between compounds when subjected to preselected conditions. In some instances, the self-repairing cement-polymer composition may also include a phase separation inhibitor. In some examples the epoxide is a polymer, however in other instances it may be an oligomer. In some arrangements the epoxide polymer includes an epoxy-terminated polysulfide polymer or other polymer that includes a terminal epoxide group. In one arrangement this is then combined with a crosslinking agent (tetra thiol) and a PEO surfactant serves as a phase separation inhibitor.

In some arrangements the phase separation inhibitor maybe a polymer having at least one terminal functional group selected from the group consisting of amines; thiols; epoxides; alcohols; amides; carboxylates; carbonyls; and combinations thereof, that is reactive with the epoxide. More specifically the phase separation inhibitor maybe poly(ethylene glycol), diglycidyl ethers (PEO); poly(ethylene) glycols (PEG); bisphenol diglycidyl ethers (BPA); and combinations thereof.

In some arrangements the crosslinking agent includes a functional group selected from the group consisting of hydrogen; alcohol; thiol; ether; ester; amine; amide; and combinations thereof. The mechanism for self-repair may include a process selected from the group consisting of thiol metathesis; thiolate exchange; epoxide ring opening; metal coordination; ionic coordination; Diels-Alder bonding; and combinations thereof.

In some arrangements the basic composition may be mixed with an aqueous solvent to form a slurry made up of a cement containing material; an unencapsulated epoxide having at least one disulfide (S—S) group therein, a crosslinking agent; and an aqueous solvent all combined to cure under preselected conditions and to form a dynamically self-repairing cement polymer matrix that reforms chemical bonds between compounds when subjected to those preselected conditions.

In one specific example, the self-repairing cement-polymer composition of includes an epoxy-terminated polysulfide polymer; a terathiol crosslinking agent; and a PEO surfactant as a phase separation inhibitor.

In another example the cement-polymer composite-forming slurry is made up of a cement containing material; an unencapsulated epoxide polymer having at least one disulfide (S—S) group and at least one terminal epoxide group therein; a crosslinking agent including a functional group selected from the group consisting of hydrogen; alcohol; thiol; ether; ester; amine; amide; and combinations thereof; and a phase separation inhibitor that is reactive with the unencapsulated epoxide polymer, the phase separation inhibitor selected from the group consisting of poly(ethylene glycol) diglycidyl ethers (PEO); poly(ethylene) glycols (PEG); bisphenol diglycidyl ethers (BPA); and combinations thereof. The cement containing material, unencapsulated epoxide polymer, a crosslinking agent, and phase separation inhibitor all combined to form a dynamically self-repairing cement polymer matrix that reforms chemical bonds between compounds using a process selected from the group consisting of thiol metathesis; thiolate exchange; epoxide ring opening; metal coordination; ionic coordination; Diels-Alder bonding; and combinations thereof when subjected to preselected conditions.

The purpose of the foregoing abstract is to enable the United States Patent and Trademark Office and the public generally, especially scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIGS. 4A-4G illustrates different chemical bonding approaches utilized in concert with the present invention for composite formation and self-repair.

DETAILED DESCRIPTION OF THE INVENTION

The following provides examples for specific cement polymer composites with enhanced physical properties and dynamic self-repair capabilities. While various examples are described it should be understood that these descriptions are illustrative of exemplary embodiments and that invention is not intended to be limited to these specific examples. It will be clear that the invention is susceptible of various modifications and alternative constructions. Therefore, it should be understood that there is no intention to limit the invention to the specific forms disclosed, but, on the contrary, the invention is intended to cover all modifications, alternative constructions, and equivalents falling within the spirit and scope of the invention as defined in the claims.

Figure 1:
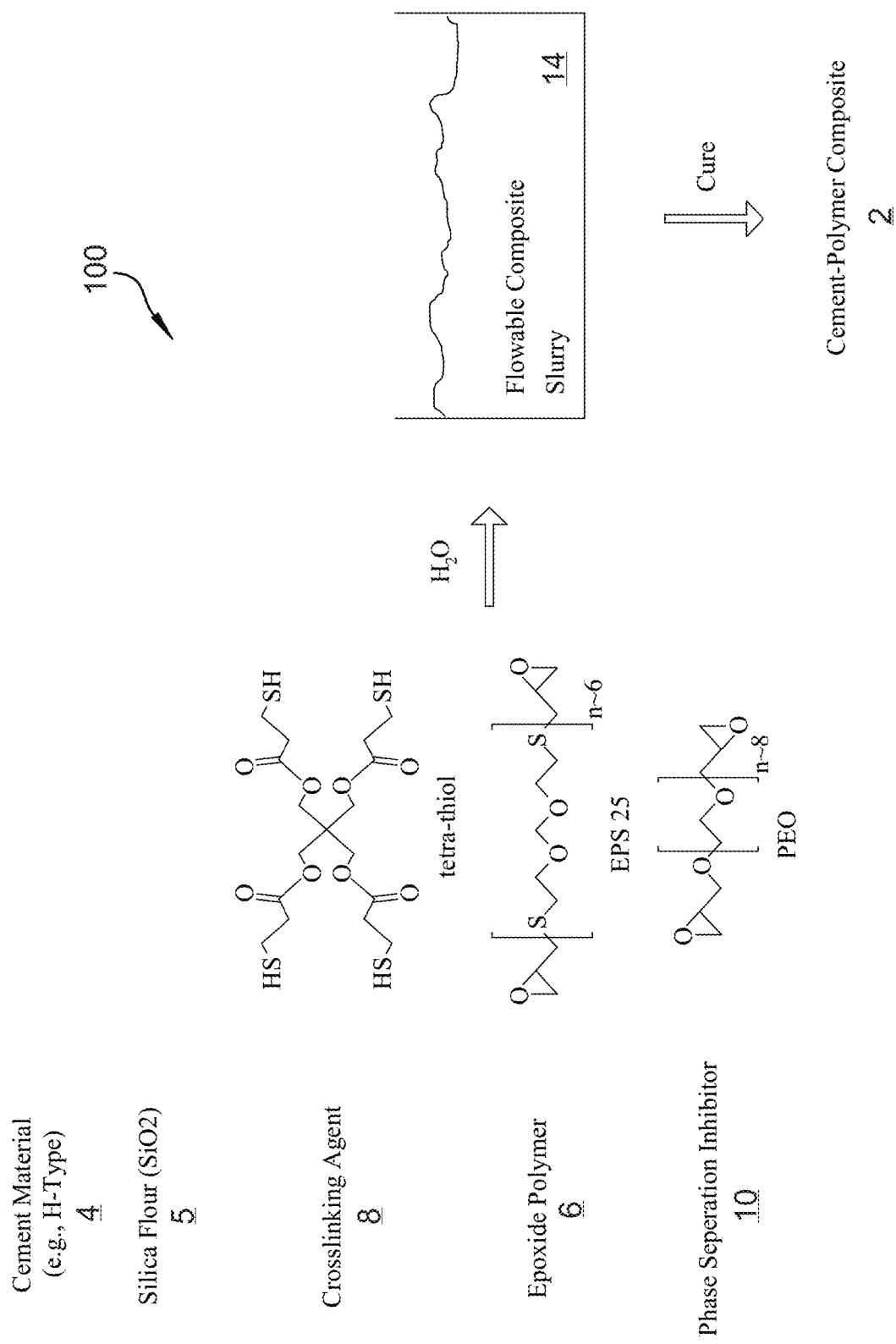
FIG. 1 illustrates an exemplary polymer-cement composite and process of making in accordance with the present invention.

FIGS. 1-6 show different embodiments of cement-polymer composites of the present disclosure and processes of making and using same. Referring first to FIG. 1, one exemplary process 100 for fabricating self-repairing cement-polymer composites 2 of the instant disclosure is shown. In the figure, a cement-containing material 4 comprised of a mixture of selected metal oxides is combined with an epoxide polymer 6 and a crosslinking agent 8 and an optional phase-separation inhibitor 10. Components 4, 6, 8, and 10 can be combined in an aqueous medium to form a flowable cement-polymer composite slurry 14. Phase-separation inhibitor 10 can be mixed in the composite slurry 14 to prevent separation of organic and inorganic materials therein. Slurry 14 can then be delivered following preparation for use in various receiving structures, fill locations, and/or applications described further herein. The slurry 14 when cured forms the self-healing cement-polymer composite matrix 2. The terms "cement-polymer composite" and "cement-polymer composite matrix" refer to the cured state of the slurry after delivery into receiving structures and/or fill locations.

Cement-containing materials suitable for use include Ordinary Portland Cements (OPCs) such A (type I); B (type II), C (type III), D (type IV), and H (type V), for example. Typical OPCs include various fractions of inorganic oxides including calcium oxide (CaO) (e.g., 61%-67%); silicon oxide (SiO2) (19%-23%); aluminum oxide (Al2O3) (2.5%-6%); iron oxide (Fe2O3) (0-6%); and sulfur oxides such as sulfites (SO3) (1.5%-4.5%). Other cementitious materials may also be utilized such as mortars; limes; limestone fines; fly ash; granulated blast furnace slags; silica containing materials and powders; concretes; other refractory materials; and combinations of these various materials, for example. Concentrations of these cement-containing materials 4 and oxide fractions can also be varied to obtain desired physical properties or to meet application and operation conditions and parameters and therefore are not intended to be limited. For example, concentrations of cement-containing materials 4 can range from about 10 wt % to about 95 wt %.

Figure 2A:
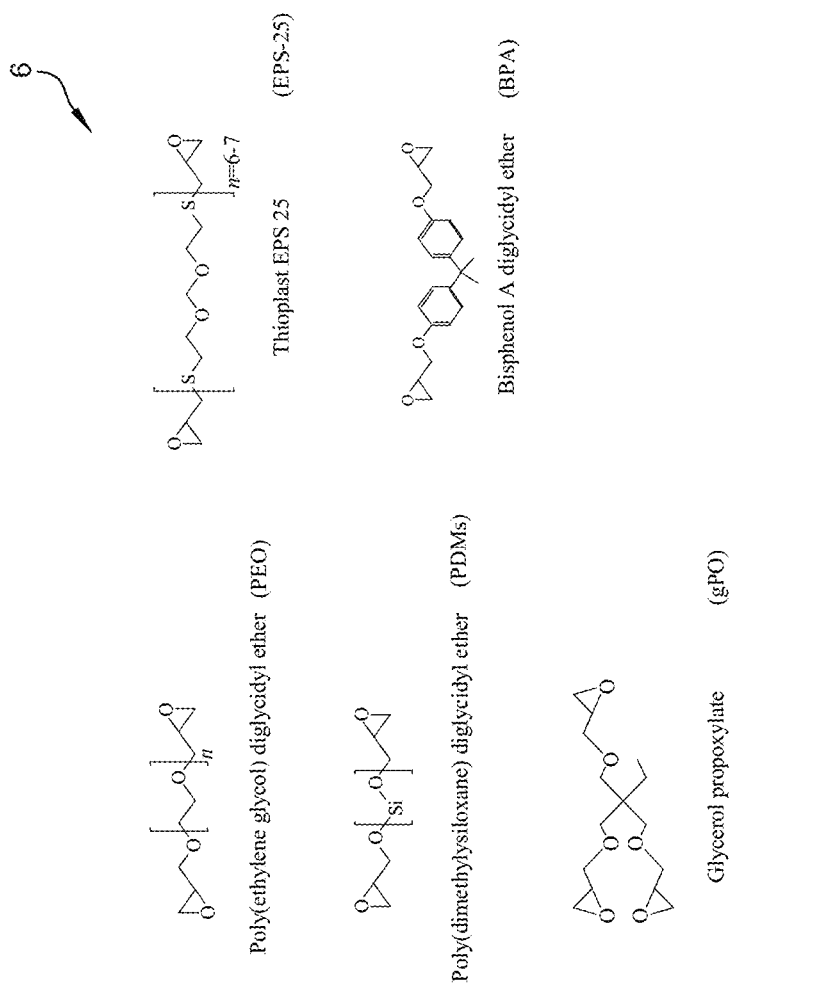
FIGS. 2A-2C illustrate exemplary composite materials utilized with cement-polymer composites of the present invention.

Exemplary epoxide polymers 6 suitable for use are shown in FIG. 2A. These include poly(ethylene glycol) diglycidyl ethers (PEGs); poly(dimethylsiloxanes) (PDMS); poly(dimethylsiloxane) diglycidyl ethers; glycerol propoxylates (gPO); bisphenol-A-diglycidyl ethers (BPA); epoxy-terminated polysulfide polymers such as Thioplast™ EPS resins (AkzoNobel Functional Chemicals GmbH, Greiz, Germany) including EPS-25; EPS-70; EPS-80; EPS-360, for example; and combinations of these various polymer types. Concentrations of epoxide polymers 6 can vary depending on physical properties selected for the cement-polymer composites 2 for intended applications including structural mechanical strength, torsion and shear (adhesion) strength, matrix permeability reduction, and self-repair. For example, in some embodiments, epoxide polymers 6 can have a concentration up to about 95 wt %. In some embodiments, epoxide polymers 6 can have a concentration from about 5 wt % to about 20 wt % or greater.

Figure 2B:
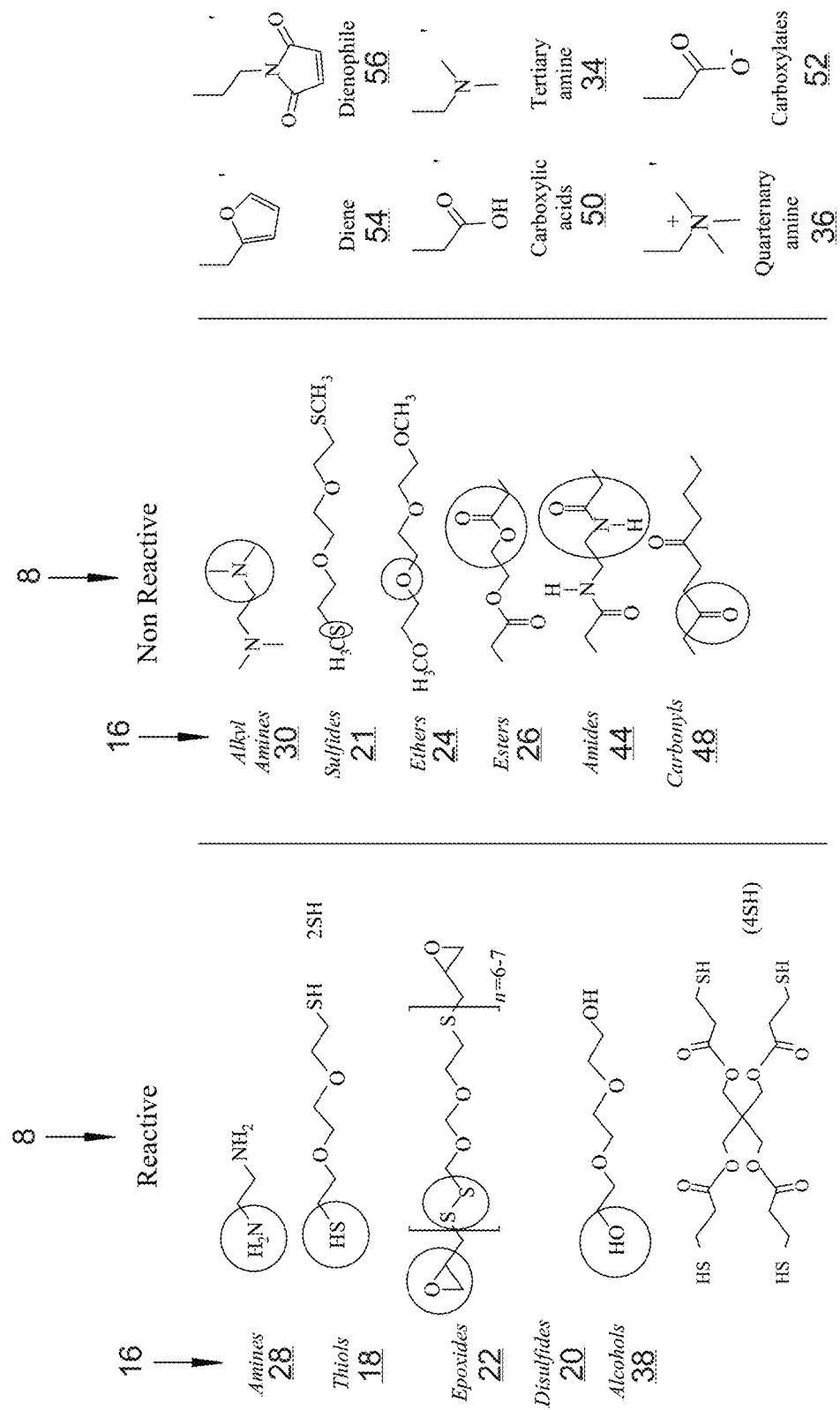

Exemplary crosslinking agents 8 suitable for use are also shown in FIG. 2B. These include 2,2-(Ethylenedioxy)diethanethiol, a dithiol comprised of two S—H groups; trimethylol propane tris(3-mercaptopropionate), a trithiol; Pentaerythritol tetrakis (3-mercaptopropionate), a tetrathiol; alkylamines including ethylenediamines (EDs), 4-(2-aminoethyl)morpholine (Morphs), piperazines (Pips); N,N-dimethylethylenediamines (N,N-EDs), furfuryl amines (Fur); Beta-alanine ethyl ester hydrochloride (ALA-HCL); beta-alanine (ALA); dopamine hydrochloride (Dopa); glycols such as triethylene glycol; and alkyl capped glycols such as triglyme, for example. Other suitable crosslinking agents may also be utilized, for example.

Chemical functional groups 16 are also shown that when present as chemical moieties in these polymers form effective coordination bonds 70 with cement-containing materials 4 and epoxide polymers 6 in the cement-polymer composite slurry 14 and with various structures 62 and materials 64 contacted by the composite slurry 14 when introduced in receiving structures 60 and locations. Chemical functional groups 16 utilized in cement-polymer composites 2 of the instant disclosure include thiols (—C—S—H or —R—S—H) 18; sulfides (—S—S—) 20; epoxides (cyclic ethers with a 3-atom ring containing an oxygen atom) 22; ethers (C—O—C') 24; esters (—C=O—O—C'—) 26; amines (—NH2) 28; primary and alkyl amines (—R—NH2) 30; secondary amines (R1)(R2)-N—H 32; tertiary amines (—(R1)(R2)(R3)-N) 34; Quarternary Amines (—(R1)(R2)(R3)(R4)-N+) 36; amides (—R1-C=ON(H)(R2) i.e. carbonyl group linked to a nitrogen) 44; amidines [e.g., HN=C(R1)NH2; (R1)N=C—NH(R2); and (R1)N=C—N(R2)(R3)] 46; cyclic dienes (of the type —R—C=C—C=C—O—) 54; dienophiles [—R—N—(C=O)—C=C—(C=O)—] 56; and other nitrogen-containing groups; carbonyls (—C=O and —R—C=O) 48; carboxylic acids (—COOH and —R—COOH) 50; carboxylates (—COO⁻ and R—COO⁻) 52; hydroxyls and alcohol groups (—R—OH) 38; and combinations of these chemical functional groups.

Crosslinking agents 8 that form coordination bonds 70 by opening epoxide groups 22 in the backbone chain of epoxide polymers 6 during curing of the composite slurry 14 are termed "reactive" crosslinking agents. Crosslinking agents 8 that form coordination bonds 70 without opening epoxide groups 22 in epoxide polymers 6 during curing of the composite slurry 14 are termed "non-reactive" crosslinking agents. Both reactive and non-reactive crosslinking agents 8 with their various coordination groups 16 can be utilized to effect coordination and self-healing in cement-polymer composites 2 described herein. Concentrations of crosslinking agents 8 can be varied to tailor rheological properties of the cement-polymer slurry 14 and viscoelastic properties of epoxide 6 and crosslinking polymers 8 in the cured cement-polymer matrix 2 resulting in effective self-healing and re-adhering capabilities. Concentrations are thus not intended to be limited. For example, in some embodiments, crosslinking agents 8 have a concentration up to about 95 wt %. In some embodiments, crosslinking agents 8 have a concentration from about 5 wt % to about 20 wt % or greater.

Figure 2C:
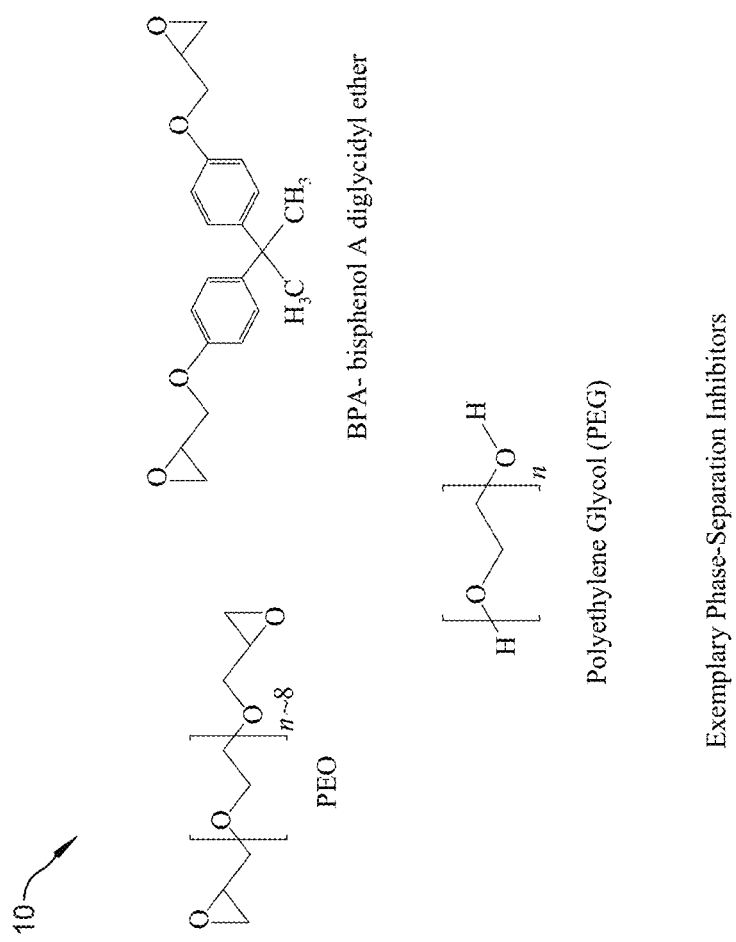

Phase-separation inhibitors (PSIs) 10 prevent separation between organic materials including epoxide polymers 6, crosslinking agents 8 and inorganic cement-containing materials 4 (e.g., OPCs) in the composite slurry 14 as the cement-polymer composite matrix 2 forms during curing. Exemplary PSIs 10 are shown in FIG. 2C. These include bisphenol-A-diglycidyl ether (BPA); and poly(ethylene glycols) (PEGs); and polymer surfactants such as Poly(ethylene glycol) diglycidyl ether (PEO), for example. Other suitable PSIs may also be utilized. PSI 10 concentrations can vary depending on types and quantities and concentrations of other components in the cement-polymer composites 2. PSIs 10 typically have concentrations selected from about 0 to about 20% by weight. In some embodiments, these polymers can include reactive chemical functional groups described above.

Compressive strength can be enhanced by addition of compressive strength enhancing agents including, for example, heat-treated (600° C.-900° C.) kaolin, bentonite, other enhancing agents, and combinations of these various enhancing agents with concentrations up to 20% by weight (wt %) in the dry composite mixture.

Shear strength can be enhanced by addition of shear strength enhancing agents including, for example, fumed silica and/or methylcellulose, or other agents with concentrations up to 20% by weight (wt %) in the dry composite mixture. Shear-strength can also be increased by introducing Poly(ethylene-co-acrylic acid)Zn salt and BPA, PEO, ED, and/or N,N-ED (1:1:1:1 ratio) to these composites.

Fracture toughness can be enhanced by addition of agents such as, for example, nanoparticles comprised of carbon black, multi-walled carbon nanotubes, and graphene sheets; fibers comprised of poly(vinyl) alcohol (PVA), high modulus polyethylene (PE), nylon, aromatic polyamides such as high-performance ARAMID® fibers, polyester, glass, and carbon; and combinations of these various materials.

In one embodiment, the cement-polymer composite 2 can include an H-type or a G-type OPC 4 (range from 50-95 wt %), 64 wt % for example, comprising tricalcium silicate (45-75 wt %); dicalcium silicate (7-32 wt %); tricalcium aluminate (0-13 wt %); tetracalcium aluminoferrite (0-18 wt %); gypsum ($CaSO_4.2H_2O$) (2-10 wt %), magnesium oxide (0-6 wt %), sodium oxide (0-1 wt %) and/or potassium oxide (0-1 wt %); and 27 wt % added silica flour ($SiO_2$) in water (e.g., a water:cement ratio of 0.71). Water:cement ratios can be varied in the range from about 0.20 to about 0.90, and more preferably from about 0.75 to about 0.80. A mixture of 9 wt % mixture of polymers can also be added comprised of a thermally stable epoxide polymer 6 such as thiol-containing EPS 25®; a crosslinking agent 8 such as Pentaerythritol tetrakis(3-mercaptopropionate) (SH); and an optional phase separation inhibitor 10 such as the surfactant PEO in a 1:1:1 molar ratio.

In another embodiment, the cement-polymer composite 2 includes 61 wt % H-type or G-type OPC 4; 26 wt % silica flour ($SiO_2$) 5; 9 wt % Poly(ethylene-co-acrylic acid)Zn salt; and 4 wt % BPA; PEO; ED; N,N-ED (1:1:1:1 molar ratio). The water:cement ratio is about 0.54.

In another embodiment, the cement-polymer composite 2 includes 61 wt % H-type or G-type OPC 4; 26 wt % silica flour ($SiO_2$) 5; and 13 wt % Poly(ethylene-co-acrylic acid) Zn metal salt. The water:cement ratio is about 0.54.

Cement-polymer composite 2 materials described herein are exemplary only and not intended to limit either type or quantity of materials therein. Other combinations of materials described herein can also be utilized. For example, other materials can also be added to enhance physical properties that adapt the cured composite matrices 2 formed from these composites for applications in which they are utilized. Other combinations of composite materials described herein may also be utilized.

Receiving structures 60 can be filled with flowable cement-polymer composite slurries 14 of the present disclosure and cured to form the solidified cement-polymer composite matrix 2. "Receiving structures" refer to any structure or location capable of receiving and containing, or being filled with, the composite slurry 14 and enable the slurry 14 to cure. Receiving structures 60 include wellbores (e.g., wellbore annulus); building foundations; dams; fillable molds; construction preforms utilized to fabricate sidewalks and transportation roadways and bridges, for example; and other receiving structures.

Figure 3:
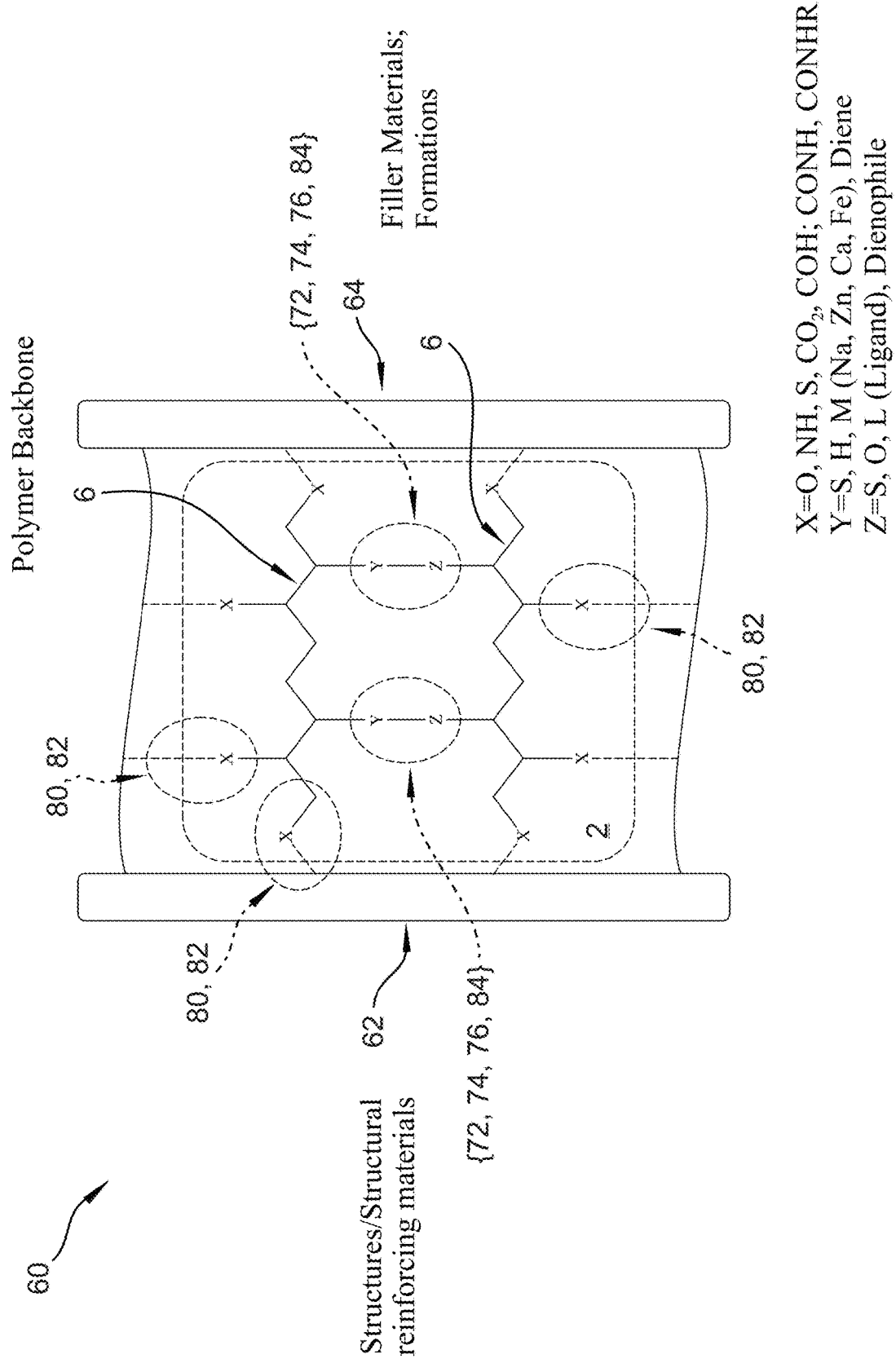
FIG. 3 shows an exemplary implementation of the present invention.

In one exemplary application shown in FIG. 3, a wellbore annulus as a receiving structure or location 60 is shown. In the figure, the cured and solidified cement-polymer composite matrix 2 is shown bonded to exemplary structures 62 and materials 64. Structures 62 can include structural supports such as metal beams, metal conduits, and metal rebar, for example. Materials 64 include building materials such as brick, mortar, stone, steel, wood, cement, and concrete; and fill materials such as sand, rock, soil, and aggregate, for example; and combinations of these various materials. In the wellbore annulus 60, structures 62 can include steel wellbore casings 62, for example. On an opposite side of the wellbore annulus 60, geological formations are typically present that can include various materials 64 such as rock and soil, for example. The composite slurry 14 readily attaches to these structures 62 and materials 64 when introduced into the wellbore 60. The composite slurry 14 cures to form a solidified cement-polymer composite matrix 2. The polymer 6, the crosslinking agent 8, and PSI 10 form various types of chemical bonds throughout the composite matrix 2 that bond and secure the composite 2 to, and between, the steel casing 62 and the geological formation 64 on opposite sides of the wellbore annulus 60 completing and sealing the wellbore 60.

Coordination, bonding, and self-healing provided by these cement-polymer composites depend in part on the types of chemical bonds that form between the various compounds in the matrix and to structures and materials that bind to the composite matrix. Exemplary types of chemical bonds in the composite matrix 2 including bond breaking and forming dynamics can include thiol-exchange 74; metathesis 76; disulfide or sulfur-sulfur bonds 20; metal coordination 80; ionic 82; Diels-Alder 86; and combinations thereof. As shown in the figure, epoxide polymers 6 can bond to the steel casing 62 and to the geological formation 64, for example, with metal-polymer coordination bonds 80, for example. Polymers 6 within the matrix 2 can also bond to other polymers 6 and crosslinking agents 8 within the matrix 2, for example, by polymer-polymer chemical bonds utilizing a disulfide or sulfur-sulfur (S—S) linkage 20, for example, as shown. Other chemical bonds can also utilize functional groups 16 described previously herein.

Figure 4A:
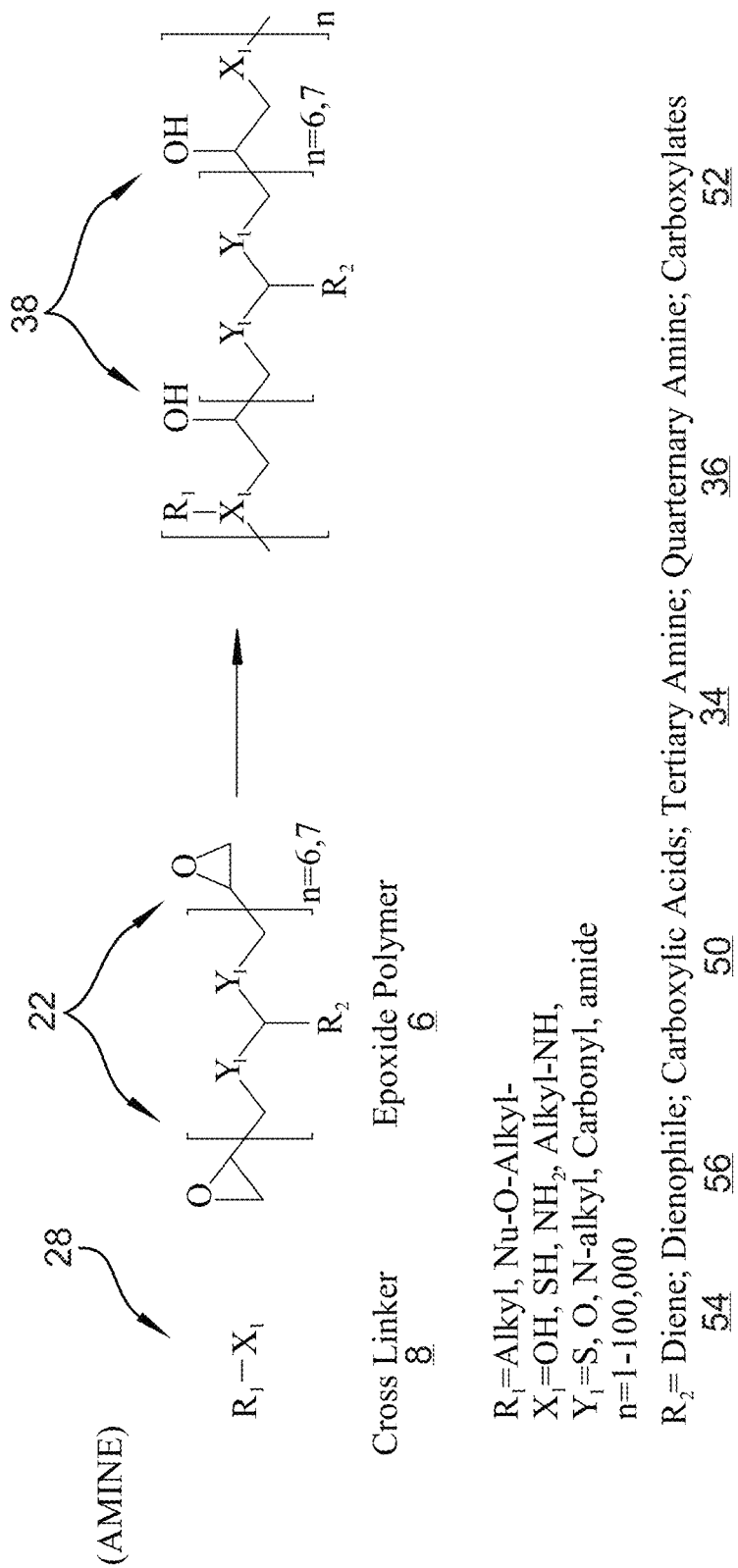

In one type of coordination shown in FIG. 4A, epoxide groups 22 in epoxide polymers 6 (e.g., —C—O—C—R2) can undergo ring opening 72 by reaction with, for example, amine (—$NH_2$) groups 28 in an amine-containing polymer 8 (e.g., $R_1$—$NH_2$). In the figure, R1 can include various nucleophiles (Nu) including alkylated hydrocarbons, as shown. Other reactive functional groups such as thiol groups (—R2-S—H—) 18 described previously may also be utilized. The epoxide polymer 6 and amine-containing polymer 8 then polymerize to form a new polymer (e.g., —$R_1$—NH—OH—R2-) with hydroxyl (—OH) groups 38 or deprotonated alkoxides (R—O—) 40 in the basic cement environment that can then coordinate with available metals (M+) 42 such as iron (Fe), calcium (Ca), Magnesium (Mg), Aluminum (Al), and zinc (Zn) in the cement-containing materials 4 resulting in formation of various metal-polymer coordination bonds 80 including metal-polymer and metal-polymer-cement coordination bonds 80, for example, during curing of the composite matrix 2 or during self-repair of the cured composite matrix 2. In one example, a metal-polymer-cement coordination bond 80 can include a bond between poly(ethylene-co-acrylic acid) 6 and zinc (Zn2+) metal 42 or calcium (Ca2+) 42 in the cement-containing material 4 forming a salt. Metal coordination bonds 80 can also form between metals (M+) 42 in metal structures 62 such as steel wellbore casings 62 or other metal structures 62, for example. In another exemplary type of chemical bond shown in FIG. 4B, epoxide groups 22 in epoxide polymers 6 such as, for example, —R1-C—O—C— 22 and —C—O—C—R2- 22 can undergo ring opening 72 by reaction with a free thiol (—R2-S—H—) group 18 or other reactive groups such as amines (—NH2 and —R—NH2-) 28. The two epoxide polymers 6 can polymerize to form another polymer (—$R_1$—C—OH—C—S—R2-) that can include any of a number of hydroxyl (—OH) groups 38 that can then coordinate with metals 42 within the composite matrix 2, or can coordinate with other metal structures 62 as described previously. These metal coordination bonds 80 enhance cohesion between compounds in the composite matrix 2 and adhesion with structures 62 to which the composite 2 bonds.

In another type of coordination bond shown in FIG. 4C, thiol exchange 74 takes place in which free thiol groups (e.g., —R2-S2-H) 18 can react with disulfide (—S1-S1-) groups 20 present in an adjacent polymer (e.g., —R1-S1-S1-R1-) 6, for example, to form a new disulfide bond (—S2-S1-) 20 that yields new polymers 6 (e.g., R2 S2-S1-R1) and newly freed thiol groups (e.g., —R1-S1-H—) 18.

In another bonding type shown in FIG. 4D, metathesis exchanges 76 take place in which sulfurs (e.g., S1) in a first disulfide bond 20 (e.g., —S1-S1-) in a first polymer (e.g., R1 S1-S1-R1) 6 react with sulfurs (e.g., S2) in a second disulfide bond (e.g., —S2-S2-) 20 in a second polymer (e.g., R2 S2-S2-R2) 6 forming two new polymers (e.g., —R2-S2-S1-R1) 6 each with a new disulfide bond (e.g., —S1-S2-) 20, for example. Other chemical functionalities and groups 16 may also be utilized.

Figure 4E:
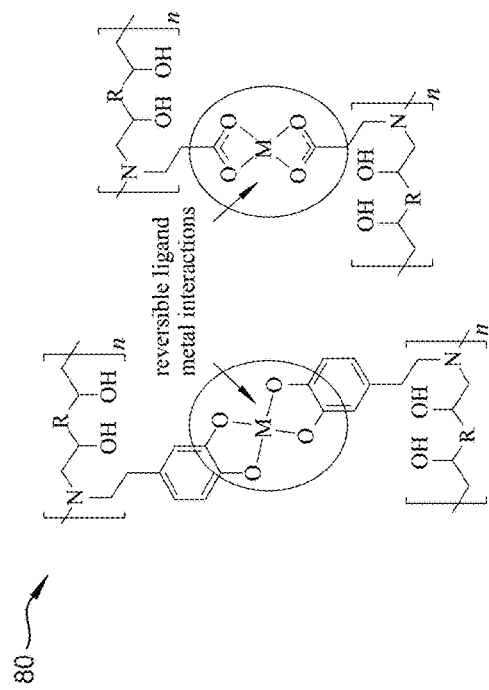

In another chemical bond type shown in FIG. 4E, ionic coordination 82 takes place. Here, one or more alcohol groups (—OH) 38 or other nucleophilic groups or ligands such as amines (—NH2) 28 present in polymers 6 and 8 in the composite matrix 2 can coordinate with metals (M+) 42 provided by cement-containing materials 4 in the composite matrix 2, for example to form ionic coordination bonds 82.

Figure 4F:
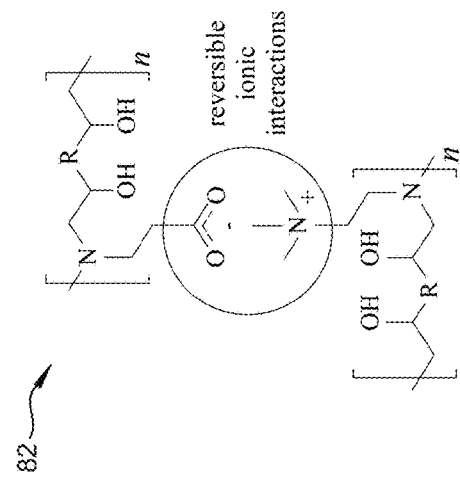

In another ionic coordination type bond 82 shown in FIG. 4F, amines (—NH2) groups 28 in one polymer 6 can coordinate with alcohol groups (—OH) 38 in other adjacent polymers 6 again forming ionic bonds 82 therein.

Figure 4G:
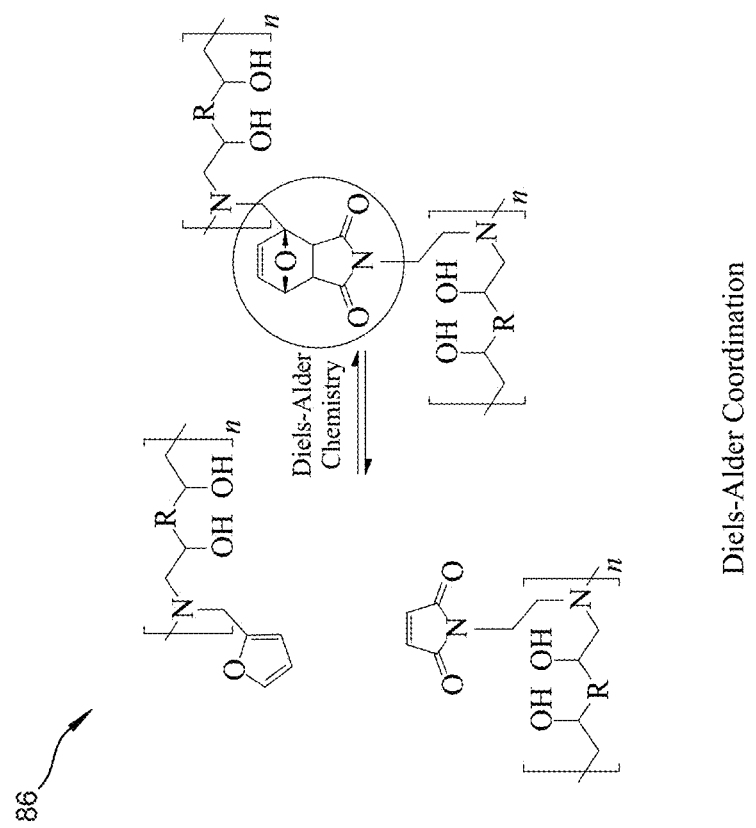

In another chemical bond type shown in FIG. 4G, a Diels-Alder type bond 86 takes place. Two polymers 6 containing heterocyclic aromatic chemical functionalities 16 and groups 16 containing heterocyclic oxygen (O) and nitrogen (N) atoms such as dienes (—R—C═C—C═C—O—) 54 or dienophiles [—R—N—(C═O)—C═C—(C═O)—] 56 can form the chemical bond 86 in the composite matrix 2 between their respective aromatic rings. Self-repair in this type of coordination can be triggered by a damage event in the composite matrix 2 that promotes formation of new aromatic group heteroatom linkages 86 that span the damage and restores bonding integrity in the matrix 2.

These cement-polymer composites can repeatedly repair structural damage in the solidified cement-polymer matrix 2 including open fractures and cracks over multiple damage events. In addition, these cement-polymer composites 2 can dynamically reform chemical bonds between structures 62 and materials 64 in contact with the composite matrix 2. Ability of these chemical bonds to dynamically rearrange, reform, or reconfigure the composite matrix 2 in response to physical damage and debonding over multiple damage events is not provided by prior art cements.

This self-repair capability is due in part to density and variety of available chemical functionalities and groups 16 in these compounds; mobility of these chemical functionalities and groups 16; and types of chemical bonds formed by these various materials. Self-repair in the damaged composite matrix 2 can be initiated, for example, when open fractures and cracks occur in the composite matrix 2 due to thermal, chemical, and/or mechanical stresses. Structural damage can expose various fragments of epoxide polymers 6 and crosslinking agents 8, for example, on either side of fractures or cracks in the composite matrix 2. Chemical functionalities and groups 16 such as thiols 18, disulfide groups 20, and other bonding interactions between cement-containing materials 4 and polymers 6 in these fragments can then undertake self-repair by forming new chemical bonds 60 that bridge fractures and cracks and restore bonding and adhesive strength to the composite matrix 2. Self-repair takes place at temperatures preferably from about 60° C. to about 300° C. which allows epoxide polymers 6 and other matrix 2 constituents to relocate within the composite matrix 2 under damage conditions.

Example 1

Four self-repairing cement-polymer composites of the instant disclosure were prepared. A first cement-polymer composite (Composite 1) was prepared by mixing 64 wt % H-type Portland cement and 27 wt % silica flour (SiO2) in water ([water:cement ratio]=0.71). A 9 wt % mixture of polymers comprised of EPS-25/4SH/PEO (1:1:1 molar ratio) was combined with the cement to form a homogeneous single-phase composite slurry. A second cement-polymer composite (Composite 2) was prepared by mixing 61 wt % H-type Portland cement and 26 wt % silica flour in water ([water:cement ratio]=0.54). 13 wt % Poly(ethylene-co-acrylic acid)Zn metal salt was combined with the cement to form the composite slurry. A third cement-polymer composite (Composite 3) was prepared by mixing 61 wt % H-type Portland cement and 26 wt % silica flour in water ([water:cement ratio]=0.54). A 9 wt % Poly(ethylene-co-acrylic acid) Zn salt and 4 wt % mixture comprised of BPA/PEO/ED/N,N-ED (1:1:1:1 molar ratio) was then combined to form the composite slurry. A fourth cement-polymer composite (Composite 4) was prepared by mixing 64 wt % H-type Portland cement and 27 wt % silica flour (SiO2) in water ([water:cement ratio]=0.54) and a 9 wt % mixture comprised of BPA/PEO/ED/N,N-ED (1:1:1:1 molar ratio) to form the composite slurry. Slurries were then poured into cylindrical plastic molds (1-inch diameter, 4-inch length) and cured for 5 days at a temperature of about 200° C. X-ray computer tomography showed polymers in each composite were homogeneously distributed through the entire cement-polymer matrix. Cured composites were tested against a control comprised of the wellbore Portland cement, Type H. In one set of tests, composites were tested for resistance to thermal stress. Samples were thermally stressed by exposing them to five cycles of temperatures from a low of 25° C. to a high of 250° C. In another set of tests, composites were tested for resistance to acid. Samples were chemically stressed by exposure to sulfuric acid at a pH=2; a temperature of 90° C.; and a NaCl concentration of 1 wt %. TABLE 1 shows results.

TABLE 1

| Test | Control Cement H + Silica Flour | Composite 1 Cement H + Silica Flour + 9 wt % (EPS25 + 4SH + PEO) | Composite 2 Cement H + Silica Flour + 13% (Polyethylene-co-acrylic acid) Zn salt | Composite 3 Cement H + Silica Flour + 9 wt % (Polyethylene-co-acrylic acid) Zn salt + 4 wt % (BPA + PEO + ED+ N,N-ED) |
|---|---|---|---|---|
| Thermal Shock | 10% reduction in strength | No reduction | NT | NT |
| Mineral Acid | 15% reduction in strength | No reduction | NT | NT |

NT = not tested.

In another set of tests, composites were tested for self-healing capability against the control. Composite samples were exposed to mechanical shear to produce fractures in the composite. TABLE 2 lists results.

TABLE 2

| Test | Control Cement H + Silica Flour | Composite 1 Cement H + Silica Flour + 9 wt % (EPS25 + 4SH + PEO) | Composite 2 Cement H + Silica Flour + 13 wt % (Polyethylene-co-acrylic acid) Zn salt | Composite 3 Cement H + Silica Flour + 9 wt % (Polyethylene-co-acrylic acid) Zn salt + 4 wt % (BPA + PEO + ED+ N,N-ED) |
|---|---|---|---|---|
| Mechanic Fractures | No repair | Visual closure of fractures | Visual closure of fractures | NT |

NT = not tested.

Control samples showed no repair, as expected. Composites 1-3 all showed closure of open fractures. Composite 1 also showed a 62%-87% reduction in permeability demonstrating that self-repair in these composites restores a significant portion of original structural integrity. Composite 1 and Composite 2 also show superior self-repair capability compared to the control cement (OPC), which was negligible. Composite 1 also exhibited a fracture toughness above a wellbore cement threshold, i.e., (0.006 MN/m$^{3/2}$).

In another set of tests, composite adherence to stainless steel (a typical material utilized in wellbores) was tested. Conditions for tests in TABLE 1 were repeated. Composites were also tested for resistance to acidic gas by exposure to $CO_2$ gas (10,000 ppm) and a NaCl concentration of 1 wt %. TABLE 3 lists bond strength results as assessed by mechanical lap shear testing for these composite samples.

TABLE 3

| Test | Control Cement H + Silica Flour | Composite 1 Cement H + Silica Flour + 9 wt % (EPS25 + 4SH + PEO) | Composite 2 Cement H + Silica Flour + 13 wt % (Polyethylene-co-acrylic acid) Zn salt | Composite 4 Cement H + Silica Flour + 9 wt % (BPA + PEO + ED+ N,N-ED) |
|---|---|---|---|---|
| No exposure | 60 psi | NT | 162 psi | 140 psi |
| Thermal Shock | 10 psi | 0 psi | 25 psi | 0 psi |
| Mineral Acid | 0 psi | NT | 40 psi | 85 psi |
| Acid gas | 165 psi | 75 psi | 20 psi | 120 psi |

NT = not tested.

Results show these cement-polymer composites exhibit generally superior adhesion strength to steel and compressive strength following exposure to repeated cycles of thermal shock and mineral acids compared to the control. Self-repair capability was again excellent, as reported above for TABLE 2.

In one final set of tests, composite ability to re-adhere to stainless steel was tested. Cement slurry samples were introduced between two concentric cylindrical steel pipes and cured so as to be confined therein. Samples were then exposed to various conditions and bond strength was then measured utilizing mechanical pipe shear tests. Force needed to move the internal pipe (surrounded by cement) vertically down was measured. The displaced pipe was then returned to the original position and cement samples surrounding the internal pipe were re-cured for 5 days at 200° C. Pipe shear tests were again repeated for the re-cured cement samples and mechanical shear force was again measured. TABLE 4 lists pipe-shear test results normalized to the contact area of the internal pipe and the internal cement-pipe interface.

TABLE 4

| Test | Control Cement H + Silica Flour | Composite 1 Cement H + Silica Flour + 9 wt % (EPS25 + 4SH + PEO) | Composite 2 Cement H + Silica Flour + 13 wt % (Polyethylene-co-acrylic acid) Zn salt | Composite 3 Cement H + Silica Flour + 9 wt % (Polyethylene-co-acrylic acid) Zn salt + 4 wt % (BPA + PEO + ED+ N,N-ED) |
|---|---|---|---|---|
| Thermal Shock | 847 psi | NT | NT | 1156 psi |
| Mineral Acid | 924 psi | NT | NT | 475 psi |
| Acid gas | 1620 psi | NT | NT | 426 psi |

NT = not tested.

For these tests, large gaps and cracks were intentionally generated to maximize contact between the fluids including the mineral acid and acid gases and the cement-steel interface. Results show the cement-polymer composite exhibited superior re-adhesion strength even after exposure to repeated cycles of thermal shock compared to the control. Results further show that re-adhesion strength after exposure to mineral acid and acid gas are high albeit lower than the control cement. Results are preliminary and not intended to be limiting, as other cement-polymer composite formulations have not yet tested. For example, addition of acid-resistance additives described above can be expected to significantly improve re-adhesion performance in cement-polymer composites in the presence of mineral acids and acid gases.

In an actual wellbore, self-healing and re-adhering capability of these cement-polymer composites will enable healing of small fractures, gaps, and cracks before they become sufficiently large for fluids to penetrate through the composite matrix. This will prevent catastrophic failure and chemical attack in the composite matrix and at cement-steel structural interfaces as compared to prior art Portland cements that generally provide no self-healing ability and alternative self-healing cements that offer only one-time self-healing ability or require fluid transport through gaps and cracks is a requirement for self-repairing.

Figure 5:
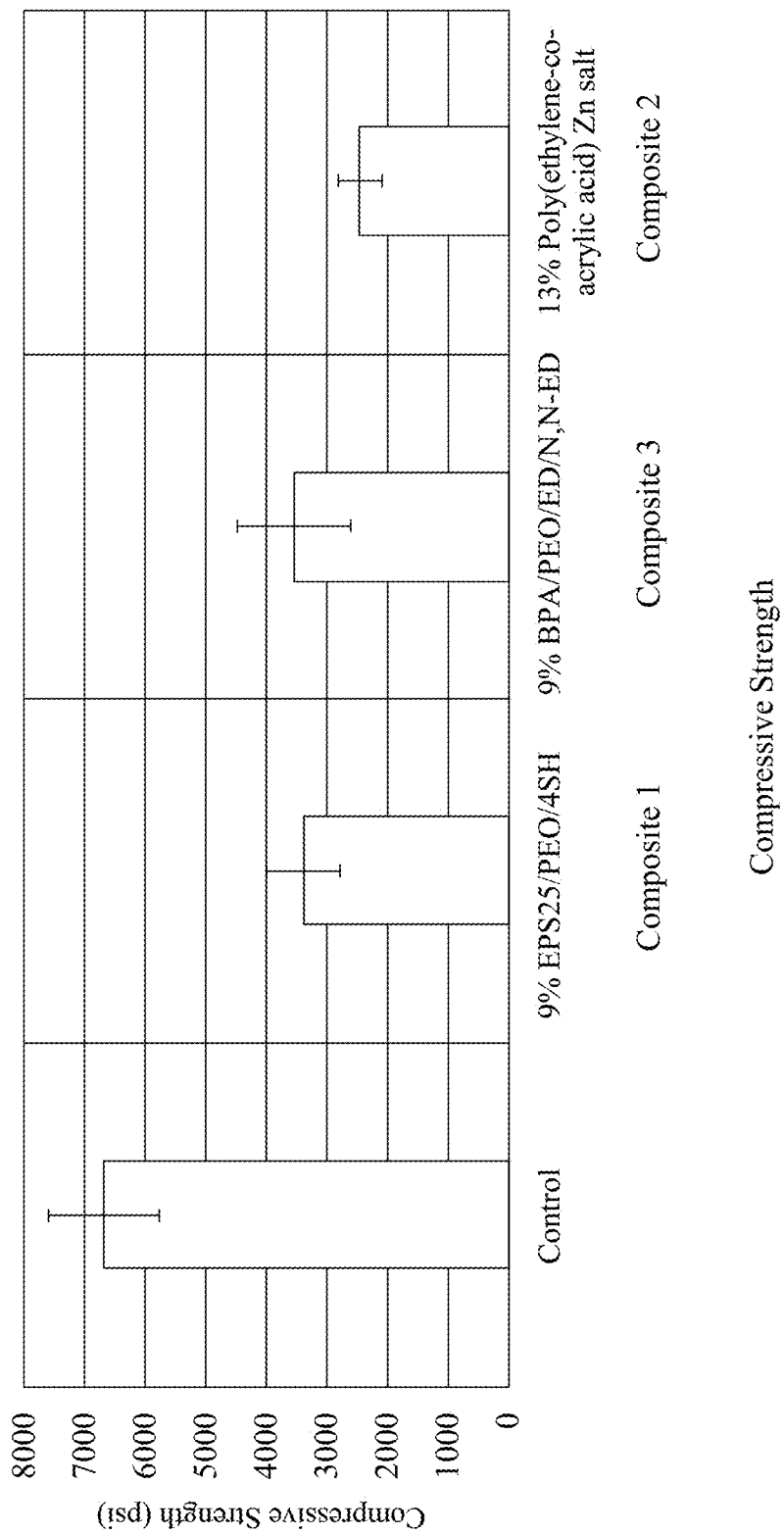
FIG. 5 compares a physical property of exemplary cement composites of the present invention and a cement control.

Compressive strength of the cement-polymer composites was also tested against the control. FIG. 5 shows results. Compressive strength for each composite was well above the 1000 psi threshold for wellbore cement applications. Composite 1 exhibited a greater than 160% improvement in adhesion strength to the steel casing material in the re-adherence tests compared to a 52% recovery in the control. Result for this composite are attributed to re-arrangement of interfacial bonds resulting in a reinforced bonding structure between the polymer-cement composite and the steel interface. Composite 2 exhibited a 72% recovery in adhesion strength after re-adhering compared to a 68% recovery in the control. Prior art cements are generally brittle which increases structural damage under mechanical shear stress events and conditions. And, as shown herein, these cements provide negligible structural self-repair in damage events increasing their need for structural intervention.

Results demonstrate that the capability of these polymer-cement composites to dynamically self-repair and re-adhere can be expected to reduce number of structural repairs needed when these materials are utilized thereby extending their useful lifetimes in various applications. Cement-polymer composites of the present disclosure represent an advance in cements that can be utilized in various applications to reduce need for intervention and repair. For example, these composites can be expected to improve economics in applications including geothermal energy and gas/oil production. Other applications and structures where structural strength, self-repair, and self-re-adhering capabilities are needed may also prove advantageous such as in dams; buildings; military installations; bunkers; roadways; and bridges, for example. Other applications are also envisioned.

The present invention is markedly distinct from the prior art. In the past encapsulation has been used to separate precursors under the belief that if this was not done that the curing would take place prematurely, and perhaps with some materials that was indeed the case. The present invention does away with this feature which the prior art taught was required. In some preferred embodiments and configurations, the polymer weight percentage is less than 30% in the dry mix (cement+silica+polymer). For composites 1 and 3, which have more than one polymer precursor, the range of molar ratios of each polymer component (precursor) and provided an example of composition inside this range where mechanical properties have been evaluated. Preferentially it has been shown that the polymer to cement dry ratio is optimal between 0.1 wt % and 30 wt %, and preferably between 5 wt % and 15 wt %, to have the minimum required mechanical properties, while still providing self-healing. In these examples the key properties included compressive strength above 6.9 MPa (1000 psi), and fracture toughness (Kc) above 0.005 MN/m$^{3/2}$. Table 5 below shows the effect of polymer concentration on compressive strength and fracture toughness for polymer-cement composites that do not include capsular structures. As the data makes clear a lower polymer weight percentage corresponds to a greater compressive strength.

TABLE 5

| w/c | Polymer (w/t %) | $K_C$ (Mn m$^{3/2}$) |
|---|---|---|
| 0.5 | 5 | 0.007 |
| 0.5 | 10 | 0.007 |

TABLE 5-continued

| w/c | Polymer (w/t %) | $K_C$ (Mn m$^{3/2}$) |
|---|---|---|
| 0.5 | 10 | 0.007 |
| 0.5 | 15 | 0.005 |
| 0.5 | 30 | <0.005 |

TABLE 6

| w/c | Polymer (w/t %) | Compressive Strength (MPa) |
|---|---|---|
| 0.5 | 5 | 14 |
| 0.5 | 10 | 12.5 |
| 0.5 | 15 | 7.8 |
| 0.5 | 30 | <6 |

Figures 6A, 6B:
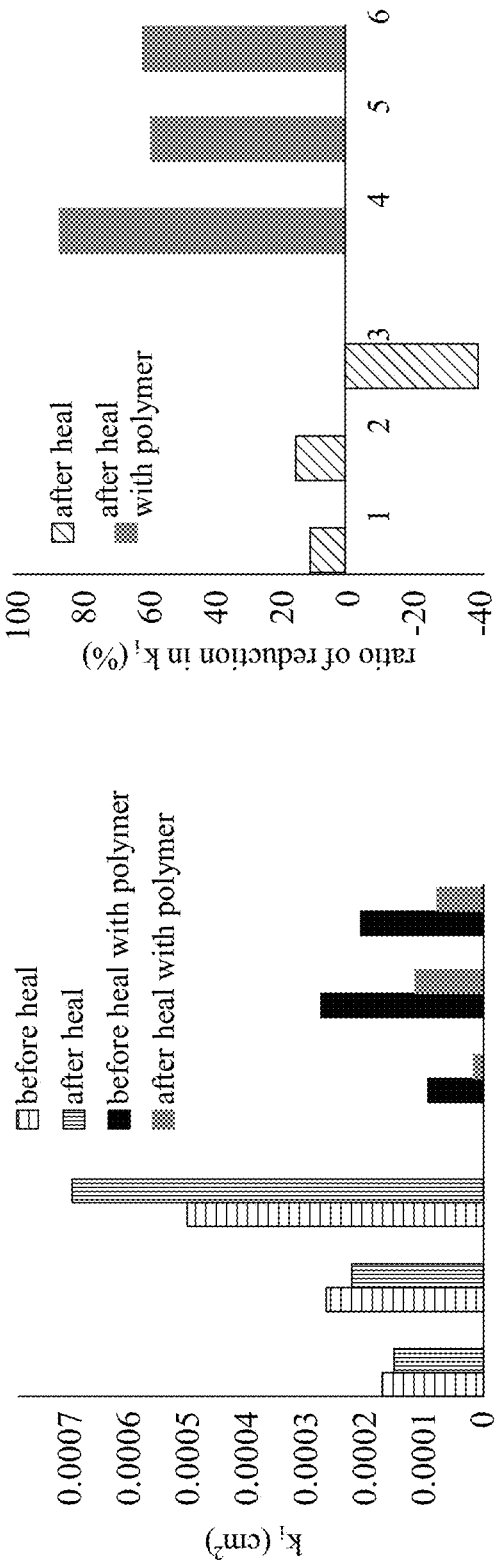
FIGS. 6A-6B show the mechanical and rheological properties of the self-healing materials on capsule free polymer cement compounds.

FIGS. 6A and 6B show the mechanical and rheological properties of the self-healing materials on capsule free polymer cement compounds. In particular, the polymer ratios in an EPS25/4SH system without phase separation inhibitor or with non-reactive phase separation inhibitors such as polyethylene glycol (PEG):tetrathiol (4SH) will be the limiting reagent, with a ratio (but not limited to) of 1 mol of thiol-based compound to 2-4 moles (range) of EPS25. However, if the thiol compound is trifunctional, or bifunctional, the ratios will change, while still keeping the thiol as limiting reagent. In an arrangement with reactive phase separation inhibitors such as PEO: For the same tetrathiol (4 SH) the molar ratios are (but not necessarily limited to) 4SH:EPS25:PEO equal 1:1-2:1-2 moles. However, if the thiol compound is trifunctional, or bifunctional, the ratios will change, while still keeping the thiol as limiting reagent. For stoichiometric ratios of EPS25 to thiol higher than 4 for 4a and 2 for 4b, phase separation inhibitor may not be needed since EPS25 becomes its own phase separation inhibitor. In fact, if EPS25 is in fact in excess this phenomenon in fact is present. The reactive or non-reactive phase separation inhibitor will have a concentration in the total polymer system of 10-99.9 wt % depending on the nature and molecular weight of the polymer.

In the sample composite 2, i.e. cement H+silica flour+ Polyethylene (co-acrylic) acid Zn salt only works for Polyethylene (co-acrylic) acid Zn salt in concentrations based in the dry mix of 0.1-30 wt %. The mechanical properties shown in FIG. 5 and Tables 2, 3, and 4 are for a formulation with for 13 wt % polymer. All of these examples are for capsule-free composites. Composite 3, i.e. cement H+silica flour+Polyethylene (co-acrylic) acid Zn salt+a mix of BPA+ PEO+N,N-ED+ED works for Polyethylene (co-acrylic) acid Zn salt in concentrations based in the dry mix of 0.1-20 wt % with the mix of BPA+PEO+N,N-ED+ED from 0.1-20 wt % with the total concentration of all polymers in cement dry mix no higher than 30 wt %. Molar ratio ranges for the BPA+PEO+N,N-ED+ED system is 1-5:1-5:2-10:1-5. Mechanical properties shown in FIG. 5 and Tables 1 and 2 are for a composite prepared with 9 wt % Polyethylene (co-acrylic) acid Zn salt+4 wt % of a mix of BPA+PEO+ N,N-ED+ED (with molar ratios 4.2:2.9:5.1:1) in the dry mix.

These polymer-cement composites of the present invention provide various advantages not provided by cement composites in the prior art. Advantages include dynamic self-repair of open fractures and cracks and other structural changes in the composite matrix in-situ; superior ability to restore bonding and adhesive strength at structural interfaces; high mechanical strength without compromising self-healing ability as in prior art cements; high thermal stability that will improve structural integrity and cement structure operation lifetimes; low cost materials that can reduce total costs associated with wellbore repair and sealing fractures in geothermal reservoirs; and enhanced physical properties expected to increase service lifetimes and minimize downtime and need for external repairs.

While preferred embodiments of the present invention have been shown and described, it will be apparent to those of ordinary skill in the art that many changes and modifications may be made without departing from the invention in its true scope and broader aspects. The appended claims are therefore intended to cover all such changes and modifications as fall within the spirit and scope of the invention.

What is claimed is:

1. A self-repairing cement-polymer composition comprising:
  a cement-containing material comprising at least one material selected from the group consisting of mortars: limes: limestone fines: fly ash; granulated blast furnace slags: concretes: ordinary Portland cements having fractions of inorganic oxides including calcium oxide: silicon oxide, and aluminum oxide, and combinations thereof:
  an unencapsulated epoxide polymer having at least one disulfide (S—S) group therein, and a crosslinking agent;
  all combined to form a dynamically self-repairing cement polymer matrix that reforms chemical bonds between compounds when subjected to preselected conditions.

2. The self-repairing cement-polymer composition of claim 1 further comprising a phase separation inhibitor.

3. The self-repairing cement-polymer composition of claim 2 wherein the unencapsulated epoxide polymer comprises an epoxy-terminated polysulfide polymer; the crosslinking agent is a tetra thiol; and the phase separation inhibitor is a PEO surfactant.

4. The self-repairing cement-polymer composition of claim 2 wherein the phase separation inhibitor is a polymer having at least one terminal functional group selected from the group consisting of amines; thiols; epoxides; alcohols; amides; carboxylates; carbonyls; and combinations thereof, that is reactive with the unencapsulated epoxide polymer.

5. The self-repairing cement-polymer composition of claim 4 wherein the phase separation inhibitor is selected from the group consisting of poly(ethylene glycol) diglyceryl ethers (PEO); poly(ethylene) glycols (PEG); bisphenol diglycidyl ethers (BPA); and combinations thereof.

6. The self-repairing cement-polymer composition of claim 1 wherein the unencapsulated epoxide polymer comprises an epoxide oligomer.

7. The self-repairing cement-polymer composition of claim 1 wherein the crosslinking agent includes a functional group selected from the group consisting of hydrogen; alcohol; thiol; ether; ester; amine; amide; and combinations thereof.

8. The self-repairing cement-polymer matrix of claim 1 wherein self-repair includes a process selected from the group consisting of thiol metathesis; thiolate exchange; epoxide ring opening; metal coordination; ionic coordination; Diels-Alder bonding; and combinations thereof.

9. A self-repairing cement-polymer slurry comprising:
  a cement containing material comprising at least one material selected from the group consisting of mortars; limes; limestone fines; fly ash; granulated blast furnace slags; concretes; ordinary portland cements having fractions of inorganic oxides
including calcium oxide; silicon oxide, and aluminum oxide, and combinations thereof;
an unencapsulated epoxide polymer having at least one disulfide (S—S) group therein, a crosslinking agent; and an aqueous solvent
all combined to cure under preselected conditions and to form a dynamically self repairing cement polymer matrix that reforms chemical bonds between compounds when subjected to said preselected conditions.

10. The self-repairing cement-polymer slurry of claim 9 wherein self-repair includes a process selected from the group consisting of thiol metathesis; thiolate exchange; epoxide ring opening; metal coordination; ionic coordination; Diels-Alder bonding; and combinations thereof.

11. The self-repairing cement-polymer matrix of claim 9 further comprising a phase separation inhibitor.

12. The self-repairing cement-polymer slurry of claim 9 wherein the unencapsulated epoxide polymer comprises a terminal epoxide group.

13. The self-repairing cement-polymer slurry of claim 9 wherein the crosslinking agent includes a functional group selected from the group consisting of hydrogen; alcohols; thiols; ethers; esters; amines; amides; and combinations thereof.

14. The self-repairing cement-polymer composition of claim 9 wherein the phase separation inhibitor includes at least one terminal functional group reactive with the epoxide thereof selected from the group consisting of amines; thiols; epoxides; alcohols; amides; carboxylates; carbonyls; and combinations thereof.

15. The self-repairing cement-polymer composition of claim 14 wherein the phase separation inhibitor is selected from poly(ethylene glycol) diglycidyl ethers (PEO); poly(ethylene) glycols (PEG); bisphenol diglycidyl ethers (BPA); and combinations thereof.

16. The self-repairing cement-polymer composition of claim 9 wherein the unencapsulated epoxide polymer comprises an epoxy-terminated polysulfide polymer; the crosslinking agent is a tetrathiol; and the phase separation inhibitor is a PEO surfactant.

17. A cement-polymer composite-forming slurry, comprising:
a cement containing material comprising at least one material selected from the group consisting of mortars; limes; limestone fines; fly ash; granulated blast furnace slags; concretes; ordinary portland cements having fractions of inorganic oxides including calcium oxide; silicon oxide, and aluminum oxide, and combinations thereof;
an unencapsulated epoxide polymer having at least one disulfide (S—S) group and at least one terminal epoxide group therein;
a crosslinking agent including a functional group selected from the group consisting of hydrogen; alcohol; thiol; ether; ester; amine; amide; and combinations thereof; and
a phase separation inhibitor that is reactive with the unencapsulated epoxide polymer, the phase separation inhibitor selected from the group consisting of poly (ethylene glycol) diglycidyl ethers (PEO); poly(ethylene) glycols (PEG); bisphenol diglycidyl ethers (BPA); and combinations thereof;
the cement containing material, the unencapsulated epoxide polymer, the crosslinking agent, and the phase separation inhibitor all combined to form a dynamically self-repairing cement polymer matrix that reforms chemical bonds between compounds using a process selected from the group consisting of thiol metathesis; thiolate exchange; epoxide ring opening; metal coordination; ionic coordination; Diels-Alder bonding; and combinations thereof when subjected to preselected conditions.

* * * * *